(12) United States Patent
Poutievski et al.

(10) Patent No.: US 9,876,705 B1
(45) Date of Patent: Jan. 23, 2018

(54) SYSTEM AND METHOD FOR ADJUSTING NETWORK TOPOLOGY WITHOUT PACKET LOSS

(71) Applicant: Google Inc., Mountain View, CA (US)

(72) Inventors: Leon Poutievski, Santa Clara, CA (US); Amin Vahdat, Los Altos, CA (US); Ashish Naik, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/377,645

(22) Filed: Dec. 13, 2016

Related U.S. Application Data

(63) Continuation of application No. 14/143,241, filed on Dec. 30, 2013, now abandoned.

(51) Int. Cl.
| | | |
|---|---|---|
| *H04L 12/28* | (2006.01) | |
| *H04L 12/751* | (2013.01) | |
| *H04L 12/24* | (2006.01) | |
| *H04L 12/931* | (2013.01) | |

(52) U.S. Cl.
CPC ......... *H04L 45/02* (2013.01); *H04L 41/0816* (2013.01); *H04L 41/12* (2013.01); *H04L 49/35* (2013.01)

(58) Field of Classification Search
CPC ..... H04L 45/02; H04L 41/0816; H04L 41/12; H04L 49/35
USPC ........................................................ 370/254
See application file for complete search history.

(56) References Cited

U.S. PATENT DOCUMENTS

| | | |
|---|---|---|
| 5,004,318 A | 4/1991 | Ohashi |
| 6,954,437 B1 | 10/2005 | Sylvest et al. |
| 6,970,617 B2 | 11/2005 | Mao et al. |
| 8,121,563 B1 | 2/2012 | Elliott |
| 8,194,638 B2 * | 6/2012 | Benner ............... H04L 12/4641 370/351 |
| 8,867,915 B1 | 10/2014 | Vahdat et al. |

(Continued)

OTHER PUBLICATIONS

Farrington, Nathan, et al. Hardware Requirements for Optical Circuit Switched Data Center Networks, In Optical fiber conference (OFC/NFOEC'11), Mar. 201.

(Continued)

*Primary Examiner* — Andrew Chriss
*Assistant Examiner* — Ellen Kirillova
(74) *Attorney, Agent, or Firm* — McDermott Will & Emery LLP

(57) ABSTRACT

A system and method are provided for updating a network including at least one optical circuit switch (OCS) to transition from an existing network topology to a new network topology. One or more intermediate topologies between the existing topology and the new topology are created. Creating the intermediate topologies includes selecting first links to be added to the existing topology without removing links, selecting additional links to be added to the existing topology upon removal of one or more existing links, and adding one or more of the selected first and additional links to the existing topology to create a first intermediate topology. It is determined whether any of the selected first and additional links are still to be added, and if no selected first and additional links are to be added, remaining links are removed. The transition from the existing topology to the first intermediate topology is then effected.

20 Claims, 5 Drawing Sheets

(56) References Cited

U.S. PATENT DOCUMENTS

| | | | |
|---|---|---|---|
| 9,065,582 B2 | 6/2015 | Barry et al. | |
| 9,065,773 B2 | 6/2015 | Aybay | |
| 2002/0042274 A1* | 4/2002 | Ades | H04L 41/0806 455/445 |
| 2004/0247317 A1* | 12/2004 | Sadananda | H04L 45/02 398/57 |
| 2006/0047800 A1 | 3/2006 | Caveney et al. | |
| 2008/0049627 A1 | 2/2008 | Nordin | |
| 2009/0285091 A1 | 11/2009 | Hiscock | |
| 2011/0134931 A1 | 6/2011 | Merwe et al. | |
| 2011/0310894 A1 | 12/2011 | Karino | |
| 2012/0185229 A1 | 7/2012 | Perrett | |
| 2013/0325947 A1* | 12/2013 | Rigdon | G06Q 50/01 709/204 |

OTHER PUBLICATIONS

Farrington, Nathan, et al. Helios: A Hybrid Electrical/Optical Switch, Architecture for Modular Data Centers, ACM SIGCOMM Computer Communication Review, vol. 40, No. 4 (2010): 339-350.

Farrington, Nathan et al. A Multipart Microsecond Optical Circuit Switch for Data Center Networking, IEEE Photonics Technology Letters 25, No. 16 (2013): 1589-1592.

Glick, et al., Dynamically Reconfigurable Optical Links for High-Bandwidth Data Center Networks, In Optical Fiber Communication Conference, p. OTuA3. Optical Society of America, 2009.

Porter, et al. Integrating Microsecond Circuit Switching into the Data Center, ACM, vol. 43, No. 4, ACM, Sep. 2013.

Schlansker, et al. "Configurable optical interconnects for scalable datacenters" Optical Fiber Communication Conference. Optical Society of America, Mar. 2013.

Office Action dated Sep. 22, 2014 in U.S. Appl. No. 13/547,949.

Notice of Allowance dated Apr. 24, 2015 in U.S. Appl. No. 13/547,949.

Notice of Allowance dated Aug. 28, 2015 in U.S. Appl. No. 13/547,949.

Notice of Allowance dated Dec. 18, 2015 in U.S. Appl. No. 13/547,949.

Office Action dated Jul. 21, 2015 in U.S. Appl. No. 14/143,241.

Office Action dated Nov. 2, 2015 in U.S. Appl. No. 14/143,241.

Office Action dated May 19, 2016 in U.S. Appl. No. 14/143,241.

Notice of Allowance dated Sep. 14, 2016 in U.S. Appl. No. 14/143,241.

* cited by examiner

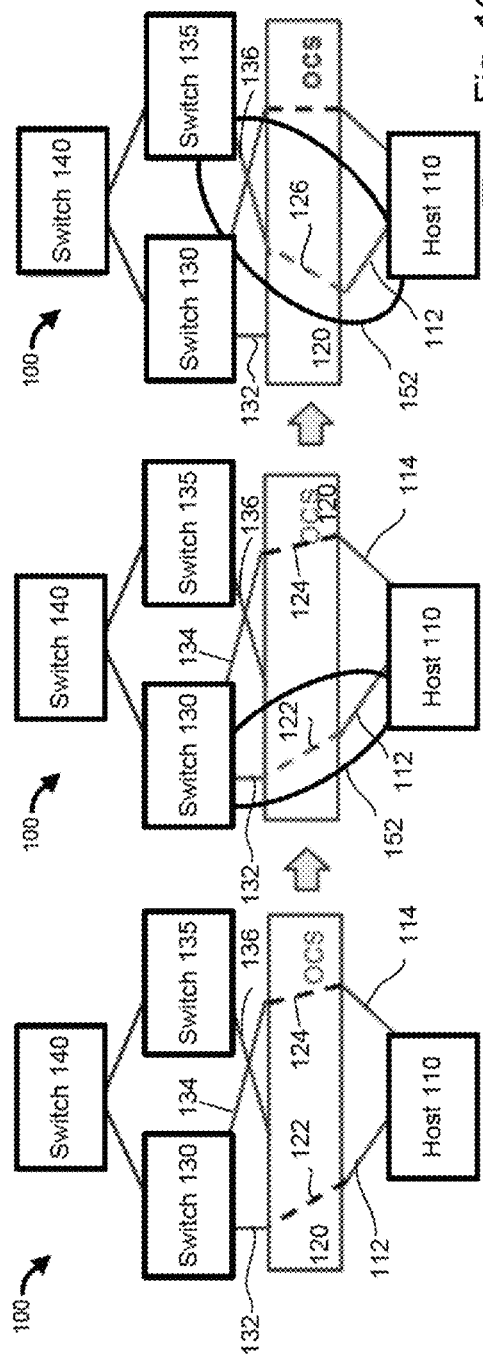

SYSTEM AND METHOD FOR ADJUSTING NETWORK TOPOLOGY WITHOUT PACKET LOSS

RELATED APPLICATIONS

The present application is a continuation of co-pending U.S. patent application Ser. No. 14/143,241, filed Dec. 30, 2013, titled "System and Method for Adjusting Network Topology without Packet Loss", the entire contents of which are hereby incorporated by reference.

BACKGROUND

Optical Circuit Switches (OCSs) allow programmable control over physical connectivity at a lower level of a multi-level network topology. Using the OCS, the topology can be adapted dynamically to improve network performance by adjusting topology based on demand, traffic patterns, etc. During the transition from one topology to another, packets can be dropped by switches. For example packets are dropped by a switch because they were forwarded to a switch which does not have a valid route to the destination and drops it. According to another example, packets are dropped by the OCS if a mirror is rotating when packet arrives. Packets may also be dropped by a switch because of queue overflow.

SUMMARY

To prevent packet loss graceful transition from a first network topology to a second network topology may be effected. For example, the transition may include identifying links to be removed from the existing topology, draining the identified links, waiting a predetermined period of time, reconfiguring the OCS to the second network topology, reconfiguring switches in the network to the second network topology, and then routing traffic through the new links. According to some examples, multiple such graceful transitions may be performed through one or more intermediate topologies.

One aspect of the disclosure provides a method of updating a network to transition from an existing network topology to a new network topology, the network including at least one optical circuit switch (OCS). The method comprises creating, by one or more computing devices, one or more intermediate topologies between the existing topology and the new topology. Such creating includes selecting first links to be added to the existing topology without removing links, selecting additional links to be added to the existing topology upon removal of one or more existing links, adding one or more of the selected first and additional links to the existing topology to create a first intermediate topology, determining whether any of the selected first and additional links are still to be added, and if no selected first and additional links are to be added, removing remaining links. The method further comprises transitioning from the existing topology to the first intermediate topology. In some instances, transitioning from the existing topology to the first intermediate topology includes identifying, by one or more computing devices, links to be removed from the existing topology, draining the identified links, waiting a predetermined period of time, reconfiguring, by the one or more computing devices, the OCS to the first intermediate network topology, the reconfiguring comprising adding one or more new links, reconfiguring, by the one or more computing devices, switches in the network to the first intermediate network topology, and routing traffic through the new links.

Another aspect of the disclosure provides a system for updating a network to transition from an existing network topology to a new network topology, the network including at least one optical circuit switch (OCS). The system comprises a memory storing a set of instructions and one or more processors in communication with the memory. The one or more processors are programmed to create one or more intermediate topologies between the existing topology and the new topology, wherein creating the one or more intermediate topologies comprises selecting first links to be added to the existing topology without removing links, selecting additional links to be added to the existing topology upon removal of one or more existing links, adding one or more of the selected first and additional links to the existing topology to create a first intermediate topology, determining whether any of the selected first and additional links are still to be added, and if no selected first and additional links are to be added, removing remaining links. The one or more processors are further programmed to update the network from the existing topology to the first intermediate topology.

Yet another aspect of the disclosure provides a non-transitory computer readable medium storing instructions executable by a processor for performing a method of updating a network including at least one optical circuit switch (OCS) to transition from an existing network topology to a new network topology. This method comprises creating one or more intermediate topologies between the existing topology and the new topology. Creating the one or more intermediate topologies includes selecting first links to be added to the existing topology without removing links, selecting additional links to be added to the existing topology upon removal of one or more existing links, adding one or more of the selected first and additional links to the existing topology to create a first intermediate topology, determining whether any of the selected first and additional links are still to be added, and if no selected first and additional links are to be added, removing remaining links. This method further includes updating the network from the existing topology to the first intermediate topology.

BRIEF DESCRIPTION OF THE DRAWINGS

FIGS. 1A-1D illustrate transitioning of a network from a first topology to a second topology according to aspects of the disclosure.

DETAILED DESCRIPTION

Figure 2C:
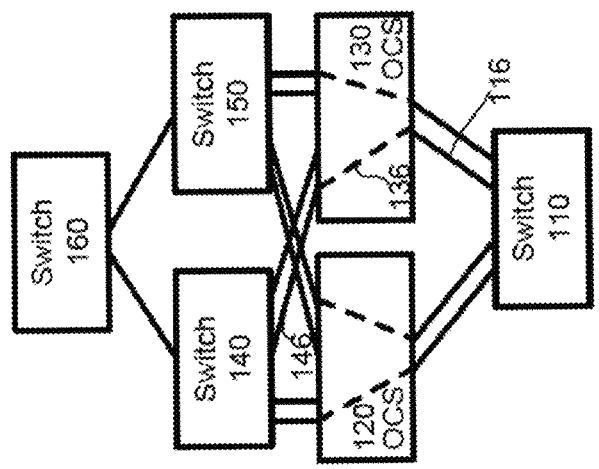
FIGS. 2A-2C illustrate transitioning of a network through an intermediate topology according to aspects of the disclosure.

Several options are presented for transitioning from a first network topology to a second network topology. According to a first option, switches are not informed about the transition and updates are only sent to the OCS to effect the target topology shift. Assuming that switches run a distributed routing protocol, the network will react to the change and converge. However, it will take time for switches to rediscover topology and converge. During the convergence, packets will be dropped and loops can occur.

According to a second option, updates are sent to the OCS and switches at the same time. However, this solution can cause packet drops. For example, if the OCS receives updates faster, ports on switches will go down temporarily blackholing traffic. Once a switch's forwarding tables are updated, it will take time for the switch to adjust forwarding tables. If switches are updated first, traffic may temporarily take wrong paths.

According to a third option, OCS connections that are about to change during a given transition are removed. Routing will adjust to route around switch ports that are not connected through the OCS. A period of time may then pass for routing convergence to complete, or an additional functionality of routing stacks may be used to facilitate routing convergence. Switches are then updated with the new topology, the OCS is reconfigured with the new topology. While this option may still result in packet loss, it will not cause transient loops.

A fourth option provides for finding links to be removed, draining the links to be removed, and waiting for routing to converge. The OCS is reconfigured to the new topology, and switches are reconfigured to the new topology, for example, by adding links. Traffic may then be routed through the new links. During this transition, connectivity is maintained while sacrificing a controlled amount of bandwidth.

A fifth option provides for multiple transitions between a first topology and a second topology. For example a sequence of intermediate topologies is created. The transition from one intermediate topology to the next results only in limited controlled drop in bandwidth capacity. The number of intermediate topologies is configurable, and is proportional to the time required to complete the procedure and inversely proportional to the maximum bandwidth capacity drop during the reconfiguration.

FIGS. 1A-1D illustrate a network 100, progressing through a topology change according to aspects of the present disclosure. The network 100 is a multi-stage network, including an OCS 120 at a lowest level of the network. The OCS 120 is coupled to host 110 and second level switches 130, 135. The host 110 may be a server, switch, or any other computing device. A third level of the network 100 includes switch 140. While a three stage network is shown, it should be understood that any number of stages may be used.

The OCS 120 may provide programmable control over physical connectivity between the host 110 and the switches 130, 135. For example, a number of links 112, 114, 132, 134, 136 exist between the host 110, the OCS 120, and the second tier switches 130, 135. The OCS 120 establishes connections between one or more of the links 112, 114 and one or more of the links 132, 134, 136. For example, as shown in FIG. 1A, connection 122 exists between links 112 and 132, and connection 124 exist between links 114 and 134. The OCS 120 may adjust topology to improve network performance, for example, based on demand, traffic patterns, or the like. According to one example, the OCS 120 and other OCSs may be controlled by a central controller. According to another example, the OCS 120 may be individually controlled or may be programmed to be independent.

While only a few switches 130, 135, 140 are shown, it should be understood that the network 100 may be expanded to include any number of switches, for example, to accommodate greater amounts of network traffic. The switches 130, 135, 140 may be routers, chips, spines, or any other type of device capable of receiving and transmitting packets.

In FIG. 1A, the OCS 120 establishes a link 122 between the link 112 and the link 132, and a link 124 between the link 114 and the link 134. Accordingly, packets flow through the network 100 through these established connections. However, these connections may be adjusted.

In FIG. 1B, a connection that will be removed is selected and drained. For example, the connection 152 including links 112, 122, and 132 in the existing topology will be removed in a new topology. Accordingly, the links 112, 122, 132 will be drained. For example, packets may be routed to use alternative routes, such as through links 114, 124, 134. According to some examples, a period of time sufficient for routing to converge may pass before moving to a next stage of the transition from the existing topology to the new topology.

In FIG. 1C, the OCS 120 is reconfigured to the new topology, which includes new connection 154. For example, the OCS establishes link 126 between the link 112 and the link 136. The host 110 and switches 130, 135 are also reconfigured. The links 112, 126, 136 are initially drained or disabled.

In FIG. 1D, the new connection 154 is undrained. For example, packets may be routed through the links 122, 126, 136. During the transition from the topology of FIG. 1A to the new topology of FIG. 1D, the host 110 and the switch 140 maintain connectivity. While a controlled amount of bandwidth is lost during the transition, no packets will be dropped.

According to some examples, a difference between an existing topology and a new topology may be so different that connectivity cannot be maintained by performing the transition in a single phase. Accordingly, multiple transitions may be performed. For example, one or more intermediate topologies may be implemented between the existing topology and the new topology.

Figure 2B:
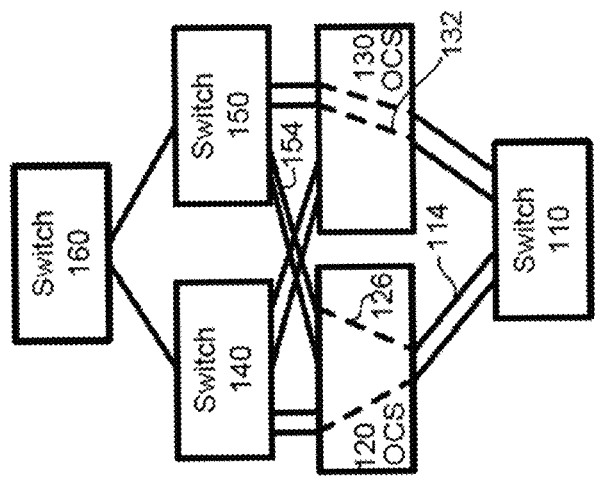
Figure 2A:
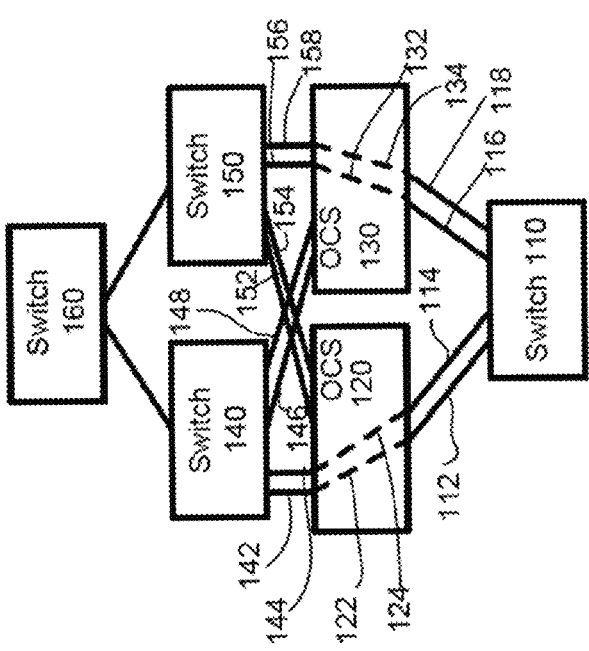

FIGS. 2A-C illustrate of transitioning from an existing topology (FIG. 2A) through an intermediate topology (FIG. 2B) to a new topology (FIG. 2C). In FIG. 2A, switch 110 has links 112, 114 to OCS 120 and links 116, 118 to OCS 130. Switch 140 has links 142, 144 to the OCS 120 and links 146, 148 to the OCS 130. Switch 150 has links 152, 154 to the OCS 120 and links 156, 158 to the OCS 130. Switch 160 at a highest level of the network is linked to the switches 140, 150. The OCS 120 connects the switch 140 to the switch 110 through links 122, 124. The OCS 130 connects the switch 140 to the switch 110 through links 132, 134.

In the intermediate topology of FIG. 2B, only one connection is adjusted. In particular, the link 124 has been removed, and a new link 126 between the switch 110 and the switch 150 is added. For example, the transition to this intermediate topology may include the techniques discussed above in connection with FIGS. 1A-1D.

In FIG. 2C, another connection is adjusted to arrive at the new topology. In particular, the link 132 is removed and new link 136 is added between the switch 110 and the switch 140. By transitioning to the new topology through the intermediate topology, only a limited controlled drop in bandwidth capacity results. According to some examples, the number of intermediate topologies is configurable. The number of intermediate topologies may also be proportional to a maximum bandwidth capacity drop during reconfiguration.

Intermediate topologies between an existing topology and a new topology may be identified, for example, in the following manner.

New links may be selected, wherein the new links are present in the new topology but not in the existing topology. Old links are links that are present in the existing topology, but not in the new topology. New links to be added may be selected by picking all links that can be added without removing any existing links from a current topology. Further new links may be selected such that removing links to make room for the additional links will not degrade connectivity below a given threshold. These additional links can be selected at random, or they can be selected to minimize bandwidth degradation.

Next, links to add may be identified. For example, some old links from the existing topology may need to be removed to make room for the selected links to be added. Removing these links will free up more ports. For example, for a single OCS, up to 2 times the number of ports may be freed, and for multiple OCS devices even more ports may be freed. One or more of the selected links may be added to the existing topology.

The updated topology with the added links may be stored as an intermediate solution. If more identified links to be added exist, then more links may be selected for removal as described above. The selected links may then be removed, and the topology at that point may be stored as an intermediate solution.

The above algorithm may also be represented by the following pseudo-code:

```
links_to_add=new_links−new_links^old_links
links_to_del=old_links−new_links^old_links
current=old_links
while links_to_add is not empty:
  // Pick links to add in the next intermediate step.
  // 1. Pick links that can be added without removing any
    existing links.
  for new_link in links_to_add:
    if new_link can be added (i.e. OCS ports to add this
      new_link are available)
      links_to_add_now+=new_link
  // 2. Pick more links that require removing existing links.
  while more links can be removed without degrading
    bandwidth:
    new_link=random        link        from
      links_to_add\links_to_add_now
    links_to_add_now+=new_link
    // We need 2 free OCS ports to add the new_link.
    ocs_port_a=OCS port needed to connect one side of
      new_link
    ocs_port_b=OCS port needed to connect one side of
      new_link
    if ocs_port_a is NOT available (it is taken by a link from
      links_to_del):
      del_link_a=link that should be removed to free
        ocs_port_a
      links_to_del_now+=del_link_a
    if ocs_port_b is NOT available (it is taken by a link from
      links_to_del):
      del_link_b=link that should be removed to free
        ocs_port_b
      links_to_del_now+=del_link_b
  // 3. Add selected links, making room by deleting old links
    if necessary.
  for old_link in links_to_del_now:
    delete OCS connection corresponding to old_link
    links_to_del−=old_link
    current−=old_link
  for new_link in links_to_add_now:
    add OCS connection corresponding to new_link
    links_to_add−=new_link
    current+=new_link
  store current as an intermediate solution
  // 4. Remove the remaining links.
  if links_to_del is not empty:
    for old_link in links_to_del:
      delete OCS connection corresponding to old_link
      links_to_del−=old_link
      current−=old_link
    store current as an intermediate solution
```

Figure 3:
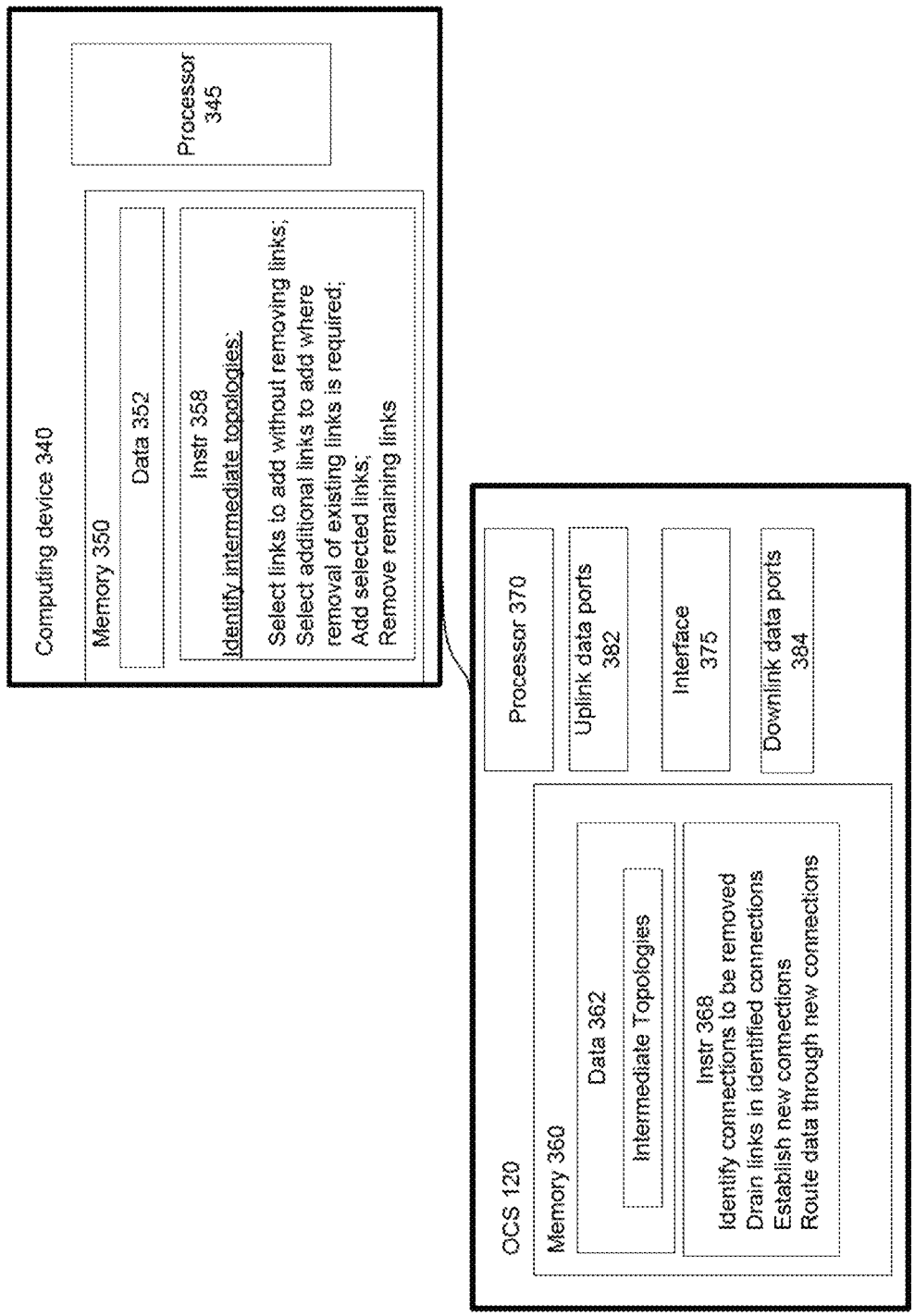
FIG. 3 is a block diagram of a switch in communication with a computing device according to aspects of the disclosure.

FIG. 3 illustrates an example of an OCS, such as the OCS 120, in communication with a computing device 340. The computing device 340 may be, for example, a server or a centralized controller. For example, the computing device may be any type of computing device capable of transmitting instructions to one or more switches, including the OCS 120, at a given time using a given protocol. The computing device 340 may comprise a memory 350, including data 352 and instructions 358, and a processor 345 coupled to the memory 350.

The memory 350 stores information accessible by processor 345, including instructions 358, and data 352 that may be executed or otherwise used by the processor 345. The memory 350 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 358 may be any set of instructions to be executed directly (such as machine code) or indirectly (such as scripts) by the processor 345. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The instructions 358 may provide for determining one or more intermediate topologies for transitioning from an existing network topology to a new network topology. For example, new links to be added are selected, such that the selected links may be added without removing existing links. Next, additional links to be added are selected, wherein the additional links to be added may require removing one or more existing links. The selected links are then added, removing existing links where necessary. An updated topology including the added selected links may be stored as an intermediate solution. Remaining links may then be removed, and the current topology may be stored as an intermediate solution.

The data 352 may be retrieved, stored or modified by processor 345 in accordance with the instructions 358. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 345 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The OCS 120 may also comprise a memory 360, including data 362 and instructions 368, and a processor 370 coupled to the memory 360. The OCS 120 may also include an interface 375, for communicating with the computing device 340. Further, the OCS 120 may include a number of data ports, such as uplink data ports 382 and downlink data ports 384.

Similar to the memory 350 of the computing device 340, the memory 360 stores information accessible by processor 370, including instructions 368, and data 362 that may be executed or otherwise used by the processor 370. The memory 360 may be of any type capable of storing information accessible by the processor, and the instructions 368 may be any set of instructions to be executed directly or indirectly by the processor 370. The data 362 may be retrieved, stored or modified by processor 370 in accordance with the instructions 368.

The data 362 may include one or more intermediate topologies for transitioning between an existing topology and a new topology. For example, the computing device 340 may compute the one or more intermediate topologies and send them to the OCS 120.

The instructions 368 may include instructions for transitioning from an existing topology to an intermediate topology, for transitioning from a first intermediate topology to a second intermediate topology, and for transitioning from an intermediate topology to a new topology. For example, the instruction 368 may reflect the techniques discussed above in connection with FIG. 1.

The interface 375 may provide a secure channel through which the computing device 340 can communicate with the OCS 120 to, for example, send the intermediate topologies or adjust links established using the OCS 120. The communications through the interface 375 may occur according to a particular protocol.

While particular instructions or operations are described above as being executed by either the computing device 340 or the OCS 120, it should be understood that either device may perform all of the described tasks. For example, the OCS 120 may identify intermediate topologies, or the computing device 340 may control transitioning between topologies. According to another example, the OCS 120 and the computing device 340 may perform various aspects of the computing together.

Figure 4:
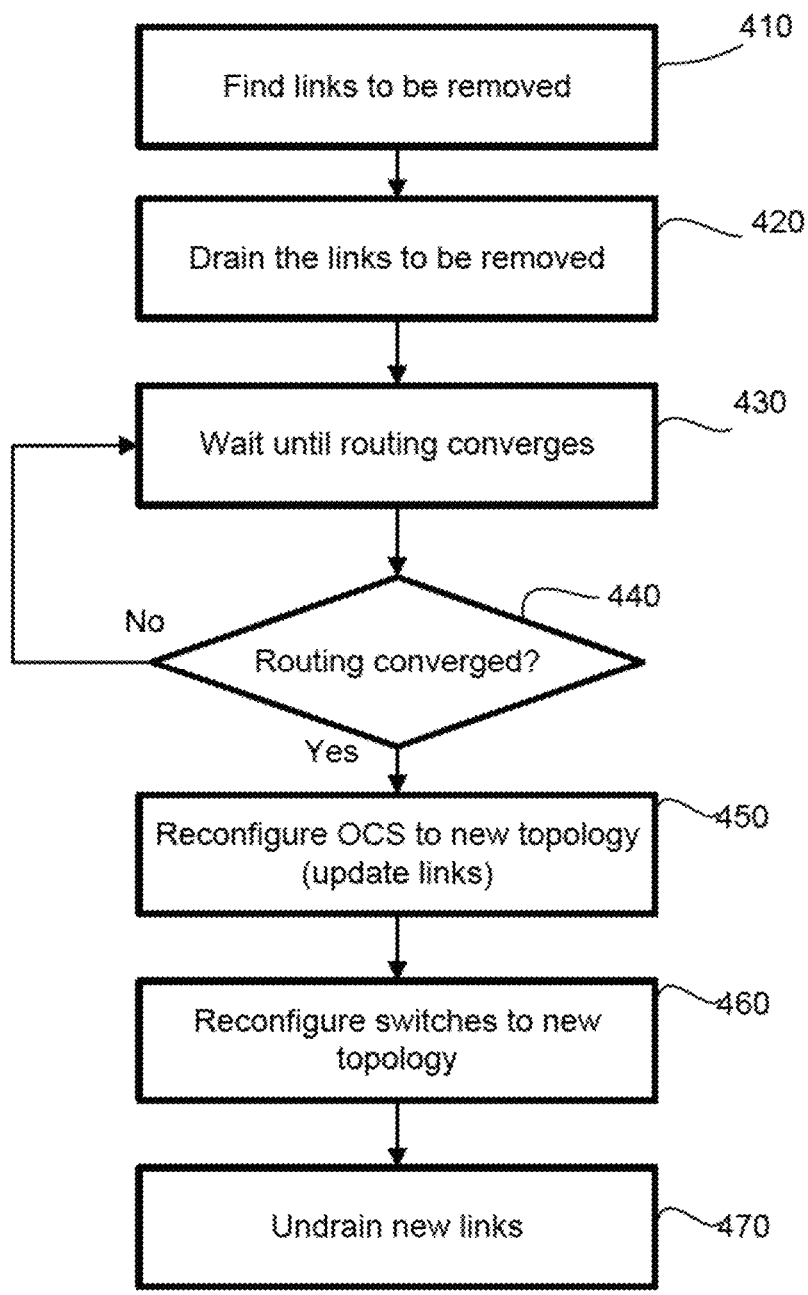
FIG. 4 is a flow diagram of an example method according to aspects of the disclosure.

FIG. 4 is a flow diagram illustrating a method 400 of transitioning from a first topology to a second topology according to aspects of the disclosure. The method 400 may be performed, for example, by the OCS 120. Alternatively or additionally, the method 400 may be performed by the computing device 240 or another device in the network. While the description below refers to a number of blocks of the method 400 in a particular order, it should be understood that the order in which the blocks are performed may be modified, and blocks may be added or omitted.

In block 410, links to be removed are identified. For example, links that exist in the first topology, but not in the second topology, are found.

In block 420, the identified links that will be removed are drained. To drain the links, routing may be updated such that the identified links are not used. For example, referring back to FIG. 1B, if the links in connection 152 are to be drained, the switch 130 and host 110 may be instructed not to use the links 112, 122, 132 in connection 152. According to one example, forwarding tables at one or more switches 110, 130, 135, 140 in the network are updated to route around the drained links, such as by adjusting priorities of flow rules or adding or removing flow rules.

In block 430, a period of time passes while routing converges. If it is determined that routing has converged in block 440, the method 400 proceeds to block 450.

In block 450, the OCS is reconfigured to the second topology. For example, the OCS is updated to establish new links that are added in the second topology. Referring to the example in FIGS. 1B-1C, the drained link 122 is removed (FIG. 1B) and the new link 126 is added (FIG. 1C).

In block 460, the switches are reconfigured to the second topology. For example, the switches may be programmed to route traffic through the new link. The new link is then undrained (block 470) and used to route traffic.

According to some examples, the second topology in the method 400 described above may be an intermediate topology. For example, in transitioning between an existing topology and a new topology, the method 400 may be repeated one or more times in transitioning through one or more intermediate topologies. The one or more intermediate topologies may be identified, for example, as described below.

Figure 5:
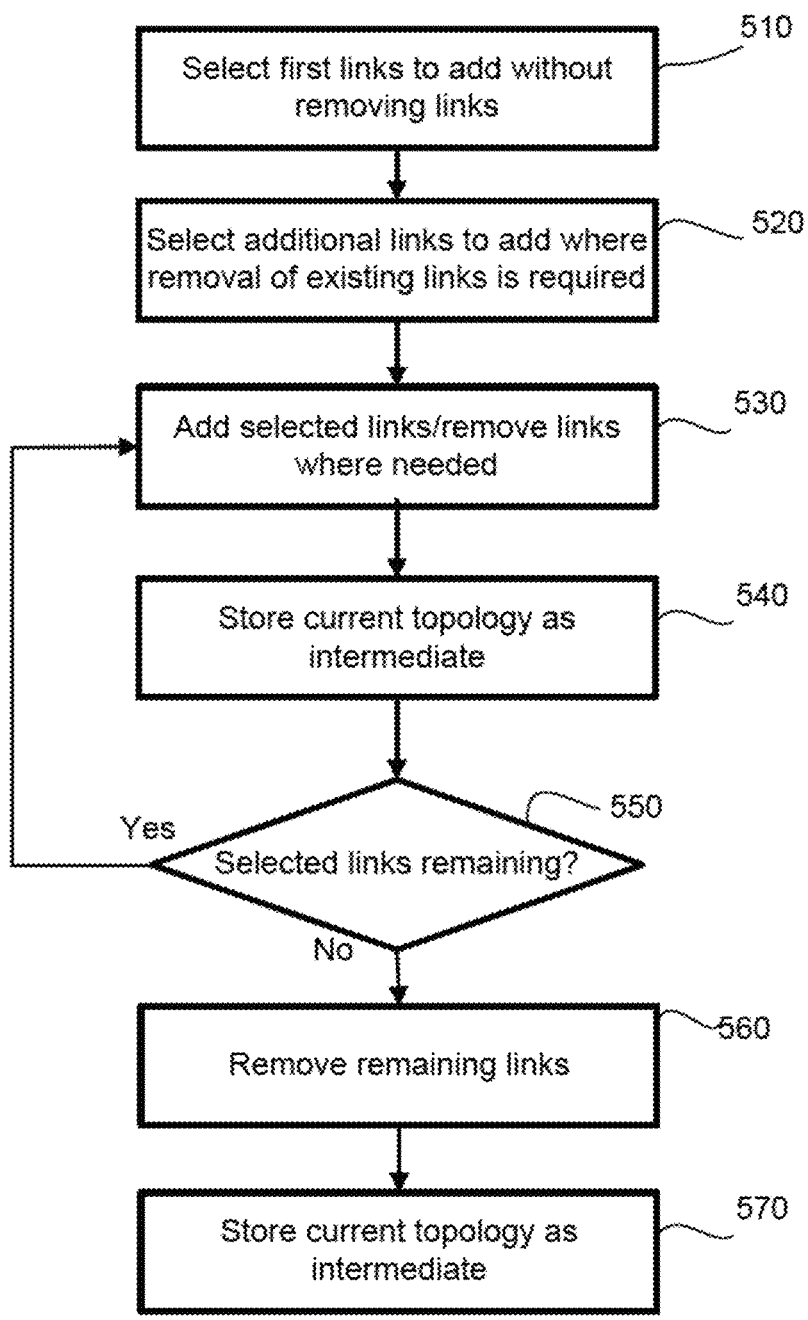
FIG. 5 is a flow diagram of another example method according to aspects of the disclosure.

FIG. 5 is a flow diagram illustrating a method 500 of identifying intermediate topologies. The method 500 may be performed, for example, by the OCS 120. Alternatively or additionally, the method 500 may be performed by the computing device 240 or another device in the network.

In block 510, one or more first links are selected, such that the first links may be added without removing links from the existing topology.

In block 520, additional links to be added are selected. Addition of the additional links may require removal of one or more existing links. For example, it may be necessary to free up ports of the OCS or switches to add the new links. However, the additional links may be selected such that removal of existing links will not degrade connectivity below a given threshold. According to one example, the additional links may be selected at random. According to another example, the additional links may be selected so as to minimize bandwidth degradation.

In block 530, the selected first and additional links are added. Where links must be removed to add one or more of the selected links, such links may be removed prior to adding the selected links.

In block 540, a current topology is saved as an intermediate topology. For example, the current topology will include the added one or more selected links, where links from the previous topology were removed where necessary.

In block 550, it is determined whether any of the selected first or additional links have yet to be added. If so, the method 500 returns to block 530. However, if it is determined that all of the selected links have been added, the method 500 proceeds to block 560, where remaining links are removed. For example, any links that are not present in the new topology, but were not removed during addition of the selected links, are removed.

The current topology at this point is then saved as another intermediate topology (block 570). While the method 500 is shown in FIG. 5 as ending at block 570, the method 500 may be repeated until arriving at the new topology.

While the methods described above refer to a number of blocks in a particular order, it should be understood that the order in which the blocks are performed may be modified, and blocks may be added or omitted.

The above-described aspects of the technology may be advantageous in preventing packet loss during topology updates. Moreover, the above described techniques provide for maximizing bandwidth during the transition.

Although the present disclosure makes reference to particular examples, it should be understood that these examples are merely illustrative of the principles and applications of the subject matter of the claims. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative examples. However, these and that other arrangements may be devised without departing from the spirit and scope of the subject matter defined by the appended claims.

What is claimed is:

1. A method of updating a network to transition from an existing network topology to a new network topology, the network including at least one optical circuit switch (OCS), the method comprising:
   creating, by one or more computing devices, one or more intermediate topologies between the existing topology and the new topology, comprising:
      selecting first links within the OCSs to be added to the existing topology without removing links, wherein each of the first links is a link within a respective OCS;
      selecting additional links within the OCSs to be added to the existing topology upon removal of one or more existing links within the OCSs, wherein each additional link is a link within a respective OCS;
      adding one or more of the selected first and additional links within the OCSs to the existing topology to create a first intermediate topology;
      determining whether any of the selected first and additional links are still to be added; and
      in response to determining that if no selected first and additional links are to be added, removing remaining links; and
   transitioning from the existing topology to the first intermediate topology, wherein transitioning from the existing topology to the first intermediate topology comprises:
      identifying, by one or more computing devices, links to be removed from the existing topology;
      draining the identified links;
      waiting until a predetermined period of time passes or until receiving a signal indicating that routing has converged;
      reconfiguring, by the one or more computing devices, the OCS to the first intermediate network topology, the reconfiguring comprising adding one or more new links; and
      routing traffic through the new links.

2. The method of claim 1, wherein transitioning from the existing topology to the first intermediate topology comprises:
   reconfiguring, by the one or more computing devices, switches in the network to the first intermediate network topology.

3. The method of claim 1, wherein draining the identified links comprises instructing one or more switches in the network not to use the identified links to route traffic.

4. The method of claim 3, wherein instructing the one or more switches comprises updating forwarding tables in the one or more switches.

5. The method of claim 1, further comprising:
   adding additional ones of the selected first and additional links in response to determining that selected links are still to be added; and
   storing a topology including the added links as a second intermediate topology.

6. The method of claim 5, further comprising storing a topology where the remaining links have been removed as a third intermediate topology.

7. A system for updating a network to transition from an existing network topology to a new network topology, the network including at least one optical circuit switch (OCS), the system comprising:
   a memory storing a set of instructions;
   one or more processors in communication with the memory and programmed to:
      create one or more intermediate topologies between the existing topology and the new topology, wherein creating the one or more intermediate topologies comprises:
         selecting first links within the OCSs to be added to the existing topology without removing links, wherein each of the first links is a link within a respective OCS;
         selecting additional links within the OCSs to be added to the existing topology upon removal of one or more existing links within the OCSs, wherein each additional link is a link within a respective OCS;
         adding one or more of the selected first and additional links within the OCSs to the existing topology to create a first intermediate topology;
         determining whether any of the selected first and additional links are still to be added; and
         in response to determining that no selected first and additional links are to be added, removing remaining links; and
      update the network from the existing topology to the first intermediate topology, wherein updating the network from the existing topology to the first intermediate topology comprises:
         identifying links to be removed from the existing topology;
         draining the identified links;
         waiting until a predetermined period of time passes or until receiving a signal indicating that routing has converged;
         reconfiguring the OCS to the first intermediate network topology, the reconfiguring comprising adding one or more new links; and
         routing traffic through the new links.

8. The system of claim 7, wherein updating the network from the existing topology to the first intermediate topology comprises:
   reconfiguring switches in the network to the first intermediate network topology.

9. The system of claim 7, wherein draining the identified links comprises instructing one or more switches in the network not to use the identified links to route traffic.

10. The system of claim 9, wherein instructing the one or more switches comprises updating forwarding tables in the one or more switches.

11. The system of claim 7, the one or more processor further programmed to:
- add additional ones of the selected first and additional links in response to determining that selected links are still to be added; and
- store a topology including the added links as a second intermediate topology.

12. The system of claim 11, the one or more processor further programmed to store a topology where the remaining links have been removed as a third intermediate topology.

13. The system of claim 7, wherein the system comprises a centralized controller.

14. The system of claim 7, wherein the system comprises an OCS.

15. A non-transitory computer readable medium storing instructions executable by a processor for performing a method of updating a network including at least one optical circuit switch (OCS) to transition from an existing network topology to a new network topology, the method comprising:
- creating one or more intermediate topologies between the existing topology and the new topology, wherein creating the one or more intermediate topologies comprises:
  - selecting first links within the OCSs to be added to the existing topology without removing links, wherein each of the first links is a link within a respective OCS;
  - selecting additional links within the OCSs to be added to the existing topology upon removal of one or more existing links within the OCSs, wherein each additional link is a link within a respective OCS;
  - adding one or more of the selected first and additional links within the OCSs to the existing topology to create a first intermediate topology;
  - determining whether any of the selected first and additional links are still to be added; and
  - in response to determining that if no selected first and additional links are to be added, removing remaining links; and
- updating the network from the existing topology to the first intermediate topology, wherein updating the network from the existing topology to the first intermediate topology comprises:
  - identifying links to be removed from the existing topology;
  - draining the identified links;
  - waiting until a predetermined period of time passes or until receiving a signal indicating that routing has converged;
  - reconfiguring the OCS to the first intermediate network topology, the reconfiguring comprising adding one or more new links; and
  - routing traffic through the new links.

16. The non-transitory computer readable medium of claim 15, wherein updating the network from the existing topology to the first intermediate topology comprises:
- reconfiguring switches in the network to the first intermediate network topology.

17. The non-transitory computer readable medium of claim 15, wherein draining the identified links comprises instructing one or more switches in the network not to use the identified links to route traffic.

18. The non-transitory computer readable medium of claim 17, wherein instructing the one or more switches comprises updating forwarding tables in the one or more switches.

19. The non-transitory computer readable medium of claim 15, the method further comprises:
- adding additional ones of the selected first and additional links in response to determining that selected links are still to be added; and
- storing a topology including the added links as a second intermediate topology.

20. The non-transitory computer readable medium of claim 19, the method further comprising storing a topology where the remaining links have been removed as a third intermediate topology.

* * * * *